Dec. 31, 1940.    G. DALKOWITZ    2,226,697
MOTOR STARTER
Filed Aug. 24, 1938
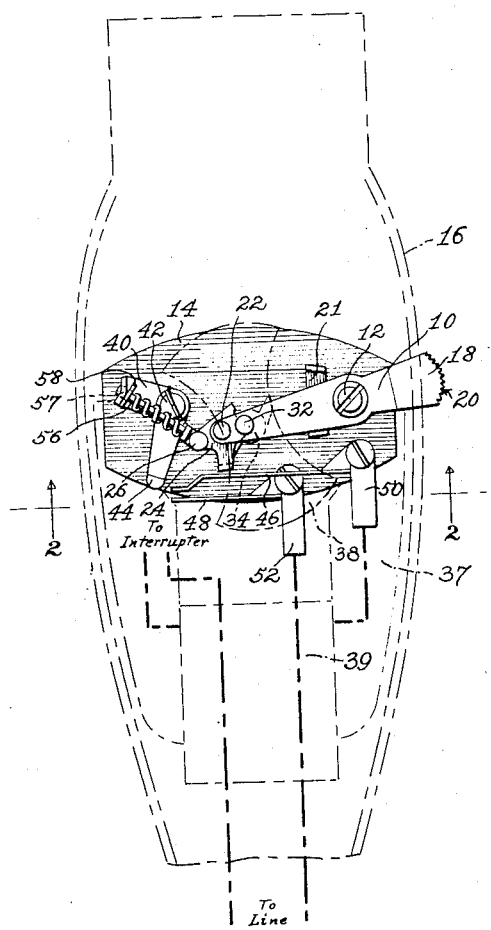
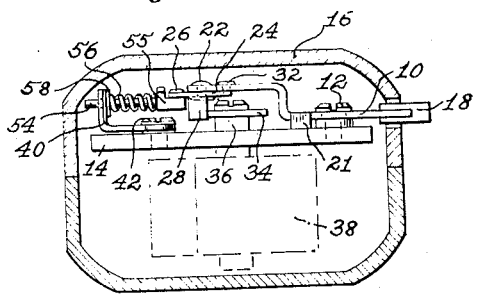
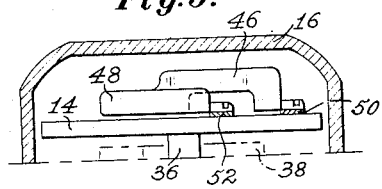
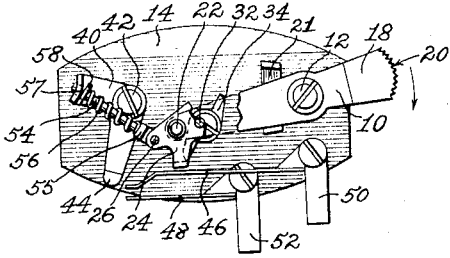
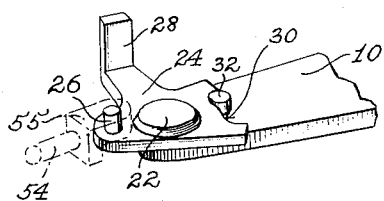
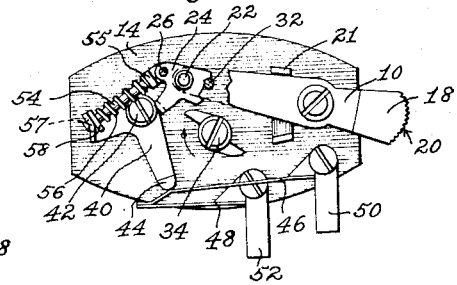
INVENTOR.
Godfrey Dalkowitz
BY
ATTORNEYS Patented Dec. 31, 1940

2,226,697

UNITED STATES PATENT OFFICE 2,226,697

MOTOR STARTER

Godfrey Dalkowitz, Brooklyn, N. Y., assignor to American Safety Razor Corporation, Brooklyn, N. Y., a corporation of Virginia Application August 24, 1938, Serial No. 226,419

11 Claims. (Cl. 172—36)

This invention relates generally to starting devices for electric motors and more particularly to starting devices for electric motors of the magnetic type. More particularly it relates to starting devices for bringing the armature of such a motor into a predetermined position so as to insure starting of the motor when electrical forces are impressed on it.

From another aspect the invention relates to a switch that will control the current flow into an electric motor of the magnetic type and will be operative at the same time to effect the starting of the motor.

While the invention has been disclosed as applied to electric motors of the magnetic type, it is to be understood that it is not necessarily restricted to such application and that as to certain phases thereof it may have other applications.

Among the general objects of the invention is the provision of a simple, effective and economical arrangement for effecting the starting of an electric motor of the magnetic type.

The conventional motor of the magnetic type comprises a field magnet that is energized so as to attract to the poles thereof a rotatable armature. For the purpose of securing rotation of the armature the field magnet is energized and deenergized at appropriate times in synchronism with the rotation of the armature. In one of the conventional types of magnetic motor a make and break mechanism for the field circuit of the motor is actuated by a cam or eccentric on the armature shaft and thereby the desired synchronism is obtained.

A motor of the magnetic type can start only under certain conditions. If the armature is in such a position that the make and break is open it is obvious that the motor will not start. On the other hand the make and break may be closed and yet the armature be in such a position that the motor cannot start. It is therefore necessary before the motor can start that the armature be in certain predetermined positions in relation to the field. If the armature is not in one of these positions, which may be described as starting positions, the motor will not start, and before it will start the armature must be moved into a starting position.

Among the more particular objects of this invention is therefore the provision in an electric motor of the magnetic type of means for moving the armature thereof into a starting position.

Among the further objects of my invention is the provision of a single means for controlling the flow of current into the motor and for bringing the armature into a starting position.

Another object of the invention is the provision of a single means for controlling the flow of current into the motor and for bringing the armature into a starting position unless it is already in such a position.

Among the objects of my invention is further the provision in a motor of the magnetic type of means, operative only when the armature is not in a starting position, for moving it into a starting position.

More specifically among the objects of my invention are the provision of a starting mechanism for a magnetic motor that is independent of the operator in its functioning; the provision of mechanism to give a starting spin of predetermined characteristics to the rotor of an electric motor, said spin being independent of the operator who merely initiates the action of the mechanism; the provision of starting mechanism for an electric motor having a toggle arrangement associated therewith, and the provision of starting mechanism for an electric motor having a quick break switch associated therewith.

For the attainment of these objects and such other objects as will hereinafter appear or be pointed out, I have shown an illustrative embodiment of the invention in the drawing, in which:

Figure 1 is a plan view of my invention shown in place in an electrical dry shaver, the parts of the latter that are related to but form no part of my invention being shown in dot and dash lines;

Figure 2 is a sectional view through the dry shaver of Figure 1, taken substantially on the line 2—2 of Figure 1, looking in the direction of the arrows, and the switch parts being omitted so as to expose the armature rotating mechanism in elevation;

Figure 3 is a fragmentary view taken similarly to Figure 2, but showing the switch mechanism in elevation, and the armature rotating mechanism to the rear thereof being omitted for the sake of clearness;

Figure 4 is a plan view of my starting mechanism similar to the showing of Figure 1, but portions being broken away to expose the underlying construction, the mechanism being shown in its initial position prior to starting the motor;

Figure 5 is a perspective view of a constructional detail; and

Figure 6 is a view similar to Figure 4, showing the mechanism in its final position after the starting operation has been completed.

Before giving a detailed description of the illustrative embodiment of my invention disclosed herein I will briefly point out its main features. The armature shaft of the motor of the dry shaver to which my invention has been shown applied is provided with arms adapted to be engaged by mechanism for imparting movement to the armature to bring it into a starting position, if the armature is not already in a starting position, and a switch is further provided for controlling the motor circuit.

A toggle mechanism is provided to actuate both the armature moving mechanism and the switch closing mechanism and the function of the operator is merely to set the toggle mechanism and to cause it to pass beyond its dead center, after which the toggle mechanism snaps into its limiting position and performs its function of closing the switch and moving the armature automatically. The speed at which these operations are performed is beyond the control of the operator.

Referring now to the drawing for a detailed disclosure of the illustrative embodiment of my invention shown therein it will be observed on viewing the same that 10 designates a lever pivotally mounted, as at 12, on a base plate 14, the latter being suitably secured within the casing 16 of a dry shaver indicated in dot and dash lines in Figure 1, and shown in section in Figures 2 and 3.

One end of the lever 10 projects out of the casing 16 of the dry shaver, and is shown as provided with a thumb piece 18 for convenient manipulation thereof. For still greater convenience the piece 18 may be roughened, as by corrugating it, as indicated at 20, so that when the finger or thumb engages the roughened portion it will not slip when the operator manipulates the lever in order to start the shaver.

It will be observed that the thumb piece 18 is positioned in relation to the shaver casing so that it is readily accessible to the thumb or finger of the same hand that is used to grasp the dry shaver.

Movement of the lever 10 is limited by a pair of abutments carried by a stop piece 21 also shown as mounted on the base plate 14.

At its inner end the lever 10 is shown as carrying a pivot pin 22, on which is mounted a pawl 24 carrying a pin 26 and provided with a finger 28. The pawl 24 is mounted on the underside of the lever 10, and the finger 28 extends downwardly, as can be seen best in Figures 2 and 5.

The pawl 24 has a cut-away portion 30 on an edge thereof which is bounded by shoulders or abutments adapted to engage a pin 32 carried by lever 10, and serving to limit the pivotal movement of the pawl in relation to the lever.

The aforementioned finger 28 of the pawl is adapted to extend into the path of the arms of a member 34 carried by the rotor shaft 36 of the dry shaver motor, which also carries the armature 38. The field magnet of the motor has been indicated in dot and dash lines at 37, and the field coil at 39.

It will be observed now that the finger 28, if moved clockwise as seen in Figures 1, 4 and 6, will, if the arms of member 34 project into its path, move the said arms and also the armature 38 in a clockwise direction. By arranging the position of member 34 so that its arms are engaged by the finger 28 whenever the armature is in a non-starting position, it will be obvious that the movement of the finger 28 in the proper direction may be used to bring the armature into a starting position.

When the lever 10 is moved in the direction of the arrow shown in Figure 4, the pawl 24 is constrained to move with it, and due to the action of the toggle arrangement to be described hereinafter it will remain in the position shown in Figure 4, in which the pin 32 engages the lower abutment of the cut-away portion 30 of the pawl, until the dead center position of the toggle arrangement is reached and the finger 28 will move the member 34 with it if the arms of the latter project into the path of the finger 28. Such a position is shown in Figure 4.

Beyond the said dead center position, by the toggle mechanism to be hereinafter described, the armature is given a rotary or spinning impulse of predetermined magnitude that is independent of the operator, who merely initiates the operation of the mechanism by setting the spring of the toggle arrangement and releasing it. The aforementioned rotary impulse is due to the discharge of energy in the spring.

After a spinning impulse has been given to the armature as described, the electric circuit supplying energy to the motor is closed by mechanism to be described, and since the spinning will have served to move the armature into a starting position the motor will then proceed to operate. As will hereinafter appear the toggle arrangement serves both to spin the armature and to close the switch, the latter having what is customarily termed a "quick break" (or quick make) action.

The said toggle arrangement, which will now be described, comprises in addition to the lever 10 and pawl 24 already described, a member 40, shown by way of example as a bell crank lever, although obviously adapted to have other forms, pivoted at 42, and provided with a cam portion 44 adapted to engage a spring finger 46 forming one element of a switch that comprises in addition to the finger 46 a second finger 48. The fingers 46 and 48 are electrically conducting and are in electrical contact respectively with conductors 50 and 52, by which they are connected to the motor circuit, as indicated in dot and dash lines in Figure 1. When the fingers 46 and 48 are brought into contact by the bending action of the cam portion 44 on the finger 46, as shown in Figure 6, the motor circuit is closed.

At 54 is shown a pin having a head 55 pivotally mounted on the pin 26 of pawl 24 and having its free end passing slidably through a slot or opening 57 in one end of one of the arms of the bell crank lever 40. The pin 54 carries a compression coil spring 56 which abuts at one end against the head 55 of pin 54 and at its other end against a washer 58 resting against the slotted portion of the lever 40.

It will be understood that due to the tendency of the spring 56 to expand, the lever 10 tends to assume a position to one side or the other of a dead center position in which the thrust of the spring is directed toward the axis of the pivot 12 of lever 10. As already mentioned hereinabove these lateral positions of the lever are limited by the shoulders of the stop member 21.

Referring now to Figure 4, which illustrates the initial position of the device, when lever 10 is moved from this position in the direction of the arrow, the pawl 24 and pin 54 will move with the lever without change in the relative positions of the pawl 24 and the lever 10, and the member 34, if engaged in the path of the finger 28 of pawl 24 will likewise be moved. By continued movement of the lever 10 the dead center position, indicated in Figure 2, will be reached. Up to this point the spring 56 is being compressed. Just as soon however as the dead center position is passed the spring 56 is released and rapidly moves the lever 10 into the position shown in Figure 6 while finger 28 spins member 34 and the armature 38 in the direction of the arrow of Figure 6. The pawl 24 is at the same time moved about its pivot 22 into the position shown in Figure 6 in which the upper shoulder of the recess 30 contacts the pin 32, and in which the finger 28 is no longer in the path of the arms of member 34, so that it will not interfere with the free rotation of the armature.

At the same time the expanding action of the spring 56 causes lever 40 to move about its pivot until the cam portion 44 thereof closes the switch 46, 48, which results in starting of the motor.

If it is desired to stop the motor it is only necessary to move the lever 10 back into the position of Figure 4, when it will be ready for another starting operation.

While I have herein disclosed an illustrative embodiment of my invention and the manner of its operation, it will be understood that the same may be embodied in many other forms without departing from the spirit thereof, as will be obvious to those skilled in the art, and that the disclosure herein is by way of illustration merely, and is not to be interpreted in a limiting sense, and that I do not limit myself other than as called for by the prior art.

Having thus described my invention and illustrated its use what I claim as new and desire to secure by Letters Patent, is:

1. In a starting device for an electric motor of the magnetic type, a lever, a pawl pivotally mounted on the lever, means carried by the lever for limiting angular movement of the pawl, complementary means on said pawl and on the rotor shaft of said motor adapted to rotate said rotor shaft when the pawl is moved, a switch for closing the motor circuit, and a resilient member associated with said switch and said pawl and adapted to cause the mechanism to move to one of two limiting positions on either side of a dead center position in which position said resilient member is inactive.

2. In a starting mechanism for an electric motor of the magnetic type, a pivoted lever, a member pivotally mounted on said lever, a projection on the armature shaft of the motor, said member being adapted to engage said projection and to move the armature shaft, a switch to close the motor circuit, a pivoted member for operating said switch, and a resilient element pivotally attached to said first member at one end thereof and having its other end in slidable engagement with said pivoted switch operating member.

3. In a starting device for a motor, a toggle mechanism comprising a pair of pivotally united members, manual means for moving said toggle mechanism to either side of a dead center position in which said members are in substantial alignment, and complementary means on said toggle mechanism and on the rotor of the motor whereby a spin may be imparted to the rotor when the toggle mechanism moves past its dead center position.

4. In a starting device for a motor, a toggle mechanism comprising a pair of pivotally united members, manual means for moving said toggle mechanism to either side of a dead center position in which said members are in substantial alignment, and complementary means on said toggle mechanism and on the rotor of the motor whereby a spin may be imparted to the rotor when the toggle mechanism moves past its dead center position in one direction.

5. In a starting mechanism for an electric motor of the magnetic type, a pivoted lever, means for limiting the angular movement of said lever, a second lever pivotally mounted at a point substantially in alignment with the mid position of said first lever and having an arm extending away from said first lever, an opening in said arm, a pawl pivotally mounted on that end of said first lever that is directed towards said second lever, means on said second lever to limit the angular movement of said pawl, a pin on said pawl so positioned that the pivotal mounting of said pawl lies intermediate the same and the pivot of the first lever, a member mounted for pivotal movement on said pin and for sliding movement within the opening of said second lever, and said member being adapted for movement over the pivot of said second lever, and a resilient element adapted to cause said member to slide in a direction toward said first lever and to move said pin laterally to either side of the line running between the axes of pivoting of said levers.

6. In a starting mechanism for an electric motor of the magnetic type, a pivoted lever of the first class, means for limiting the angular movement of said lever, a second lever pivotally mounted at a point substantially in alignment with the mid position of said first lever and having an arm extending away from said first lever, an opening in said arm, a pawl pivotally mounted on that end of said first lever that is directed towards said second lever, means on said second lever to limit the angular movement of said pawl, a pin on said pawl so positioned that the pivotal mounting of said pawl lies intermediate the same and the pivot of the first lever, a member mounted for pivotal movement on said pin and for sliding movement within the opening of said second lever, and said member being adapted for movement over the pivot of said second lever, a resilient element adapted to cause said member to slide in a direction towards said first lever and to move said pin laterally to either side of the line running between the axes of pivoting of said levers, and means associated with said second lever for closing the switch for supplying current to the motor.

7. In a starting mechanism for an electric motor of the magnetic type, a pivoted lever, means for limiting the angular movement of said lever, a second lever pivotally mounted at a point substantially in alignment with the mid position of said first lever and having an arm extending away from said first lever, an opening in said arm, a pawl pivotally mounted on that end of said first lever that is directed towards said second lever, means on said second lever to limit the angular movement of said pawl, a pin on said pawl so positioned that the pivotal mounting of said pawl lies intermediate the same and the pivot of the first lever, a member mounted for pivotal movement on said pin and for sliding movement within the opening of said second lever, and said member being adapted for movement over the pivot of said second lever, a resilient element adapted to cause said member to slide in a direction towards said first lever and to move said pin laterally to either side of the line running between the axes of pivoting of said levers, and complementary means carried by said pawl and by the rotor shaft of said motor for causing rotation of the latter when the pawl is moved.

8. In a starting mechanism for an electric motor of the magnetic type, a pivoted lever of the first class, means for limiting the angular movement of said lever, a second lever pivotally mounted at a point substantially in alignment with the mid position of said first lever and having an arm extending away from said first lever, an opening in said arm, a pawl pivotally mounted on that end of said first lever that is directed towards said second lever, means on said second lever to limit the angular movement of said pawl, a pin on said pawl so positioned that the pivotal mounting of said pawl lies intermediate the same and the pivot of the first lever, a member mounted for pivotal movement on said pin and for movement within the opening of said second lever, and said member being adapted for movement over the pivot of said second lever, a resilient element adapted to cause said member to slide in a direction towards said first lever and to move said pin laterally to either side of the line running between the axes of pivoting of said levers, a switch for closing the motor circuit, means carried by said second lever for closing the switch, and complementary means carried by said pawl and the rotor shaft of the motor for causing rotation of the latter when the pawl is moved.

9. In a motor starter for a motor having a rotor, a pivoted member, a second member pivotally mounted on said first member at a point removed from the pivot of said first member, means to limit the movement of said second member relatively to said first member, a third member pivotally mounted on said second member at a point removed from the pivot of said second member, a fourth member pivoted at a point fixed relatively to the pivot of said first member, and slidably engaging said third member, means tending to urge said third member out of engagement with said fourth member, a switch, and means associated with said fourth member adapted to close the switch.

10. In a motor starter for a motor having a rotor, a pivoted member, a second member pivotally mounted on said first member at a point removed from the pivot of said first member, means to limit the movement of said second member relatively to said first member and means carried by said second member to spin the rotor of the motor, a third member pivotally mounted on said second member at a point removed from the pivot of said second member, a fourth member pivoted at a point fixed relatively to the pivot of said first member, and slidably engaging said third member, means tending to urge said third member out of engagement with said fourth member, a switch and means associated with said fourth member adapted to close the switch.

11. In a motor, a rotor shaft provided with an arm fixedly mounted thereon, a fixed pivot, a member movable about said fixed pivot, means mounted for limited pivotal movement on said member, whereby said means is movable within limits about a pivot which is itself movable about a fixed pivot in a resultant path so that when the movable pivot moves in one direction from a limiting position said means is brought into the path of said arm for a substantial distance and thereafter outside the path of said arm for a limited distance until a second limiting position is reached, while when the movable pivot moves in the opposite direction from said second limiting position to said first limiting position, said means moves outside the path of said arm for a substantial distance and moves into the path of said arm only as it approaches closely to said first limiting position, and an arrangement for urging said movable means into one or the other of its limiting positions.

GODFREY DALKOWITZ.